US00RE34039E

United States Patent [19]

Kobayashi et al.

[11] E Patent Number: Re. 34,039

[45] Reissued Date of Patent: Aug. 25, 1992

[54] TORQUE SENSOR FOR DETECTING A SHAFT TORQUE AND AN ELECTRIC MACHINE IN WHICH THE TORQUE SENSOR IS MOUNTED

[75] Inventors: Tadahiko Kobayashi; Masashi Sahashi; Koichiro Inomata, all of Yokohama; Tomokazu Domon, Yokosuka, all of Japan

[73] Assignee: Kabushiki Kaisha Toshiba, Kawasaki, Japan

[21] Appl. No.: 302,603

[22] Filed: Jan. 27, 1989

Related U.S. Patent Documents

Reissue of:

[64] Patent No.: 4,750,371
Issued: Jun. 14, 1988
Appl. No.: 913,317
Filed: Sep. 30, 1986

[30] Foreign Application Priority Data

Sep. 30, 1985 [JP] Japan ..... 60-216575

[51] Int. Cl.[5] ..... G01L 3/10
[52] U.S. Cl. ..... 73/862.336; 310/68 B
[58] Field of Search ..... 73/862.33, 862.36, 779, 73/DIG. 2; 310/68 B

[56] References Cited

U.S. PATENT DOCUMENTS 2,457,700 12/1948 Martin et al. ..... 73/862.33
4,364,278 12/1982 Horter et al. ..... 73/862.36
4,414,856 11/1983 Winterhoff ..... 73/862.36
4,432,245 2/1984 Hattori et al. ..... 73/862.32
4,590,807 5/1986 Kobayashi et al. ..... 73/862.36

FOREIGN PATENT DOCUMENTS 57-211030 12/1982 Japan .
60-129634 7/1985 Japan .

OTHER PUBLICATIONS

SAE Technical Paper Series 820206, "Noncontact Miniature Torque Sensor for Automotive Application", W. Fleming et al.; Feb. 22-26, 1982.

*Primary Examiner*—Charles A. Ruehl
*Attorney, Agent, or Firm*—Oblon, Spivak, McClelland, Maier & Neustadt

[57] ABSTRACT

A torque sensor of noncontact type, by which can be stably measured the torque of a shaft with a sufficient S/N ratio under the influence of external magnetic noise, such as an induction magnetic flux which is produced in an induction motor, and which can be readily disposed in a comparatively small space. When provided on an induction motor, the torque sensor is mounted on the induction motor in noncontacting relationship. The torque sensor detects the torque of the shaft and includes a pair of magnetic material members provided on respective circumferential portions of the peripheral surface of a shaft. A pair of magnetic detectors are disposed at opposite locations at which external magnetic fields having opposite phase exist. The detectors detect the variation of the magnetic characteristics of the magnetic materials, and a signal processing circuit produces a mean value of output signals obtained from the magnetic detectors.

26 Claims, 7 Drawing Sheets

TORQUE SENSOR FOR DETECTING A SHAFT TORQUE AND AN ELECTRIC MACHINE IN WHICH THE TORQUE SENSOR IS MOUNTED

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a torque sensor of noncontact type and, more particularly, to a torque sensor for converting the torque of a shaft into an electric signal and to an electric machine in which the torque sensor is mounted.

2. Discussion of Background

Recently, systems for generating torque, e.g., an engine system, are required to detect a torque and produce a detection signal corresponding to the detected torque for controlling the torque generation system. Various torque sensors for detecting a torque of a shaft have been developed to meet the demand noted above. Particularly, there have been proposed noncontact torque sensors, which can measure the torque of a shaft accurately in a state of noncontact with the shaft, as disclosed in William J. Fleming and Paul W. Wood, "Noncontact Miniature Torque Sensor for Automotive Application" SAE paper 8206206, presented at the Automotive Engineering Congress, K. Harada, I. Kawajiro, M. Inoue, "A Now Torque Transducer Using Stress Sensitive Amorphous Ribbon", IEEE Transaction on Magnetics, Vol. MAG-18, No. 6, November 1982, and Japanese Patent Disclosure (KOKAI) No. 57-211030 (corresponding U.S. application Ser. No. 268890 filed June, 1, 1984). The torque sensor disclosed by William J. et al. in "Noncontact Miniature Torque Sensor for Automotive Application" measures torque applied to an engine crankshaft by making use of the fact that a magnetic characteristic, i.e., magnetic permeability, of the crankshaft is varied according to the torque applied thereto. However, the magnetic property of the measurement zone of the engine crankshaft is not uniform, and there is magnetic anisotropy on the surface and the inside of the crankshaft. Therefore, the torque cannot be measured accurately. In addition, since the engine crankshaft itself does not have high magnetic permeability, it is necessary to generate a magnetic flux sufficient to penetrate the crankshaft measurement zone and be detected. Therefore, the magnetic flux control means is inevitably large in scale. In the torque sensor disclosed by K. Harada et al. in "A New Torque Transducer Using Stress Sensitive Amorphous Ribbons" and Japanese Patent Disclosure (KOKAI) No. 57-211030, an amorphous magnetic ribbon is arranged along the entire circumference of a portion of a shaft, and a coil assembly is provided around and coaxially with the shaft. The coil assembly generates a magnetic flux parallel to the axis of the shaft, and the permeability of the amorphous magnetic ribbon that is changed, according to the torque coupled to the shaft, is measured. Although this torque sensor can solve the problem noted above, since the coil assembly generates a magnetic flux parallel to the axis of the shaft, which has a relatively high magnetic reluctance, a comparatively large exciting current has to be supplied to the coil assembly. In addition, since the coil assembly is provided around the shaft, a space for providing the coil assembly is necessary around the shaft. Therefore, the torque sensor cannot be readily assembled in the system which generates the torque, and depending on the particular application, there may not be sufficient space for assembling the torque sensor. Further, the amorphous magnetic ribbon arranged along the entire circumference of the shaft has to be given an induced magnetic anisotropy in a predetermined direction. However, it is difficult to give the amorphous magnetic ribbon arranged along the entire circumference of the shaft, i.e., a cylindrical amorphous magnetic ribbon, an induced magnetic anisotrophy in a predetermined direction. Further, the magnetic permeability of the amorphous magnetic ribbon arranged along the entire circumference of a shaft may not be uniform when the shaft is made of a Fe system. Variations of the magnetic permeability are liable to result without variations of the torque while the entire circumference of the shaft is under measurement due to lack of uniformity of the magnetic property of the shaft. Therefore, noise is introduced into the torque detection output, and the signal-to-noise ratio (S/N) is reduced. For solving such problems, a torque sensor of noncontact type was developed by Kobayashi et al. as described in U.S. Pat. No. 4,590,807, which can be readily disposed in a comparatively small space and can measure the torque of a shaft with a comparatively small exciting current and also with a sufficient S/N ratio.

However, the torque sensor of U.S. Pat. No. 4,590,807 by Kobayashi et al. also uses the variations of the magnetic permeability of the amorphous magnetic ribbon.

If, the ribbon is magnetically disposed onto circumference of the electrical machines such as an induction motor or generator, the obtained S/N ratio of the detecting output of the torque is reduced under the influence of the induction magnetic flux which the machine itself produces.

OBJECT OF THE INVENTION

The present invention has been devised in view of the above situation and has as its object to provide a torque sensor of noncontact type, which can accurately measure with a sufficient signal-to-noise ratio under the magnetic circumstances existing when there is an external magnetic field and can be readily disposed in a comparatively small space and can measure the torque of a shaft with a stable operation. It is a further object of the invention to provide an electromagnetically machine such as an induction motor on which is effectively mounted the torque sensor of noncontact type.

SUMMARY OF THE INVENTION

To achieve these objects, there is providing according to the invention a torque sensor to detect the torque of the shaft, including a pair of magnetic materials provided on a circumferential portion of the peripheral surface of a shaft to which is applied a torque, a pair of magnetic detectors disposed at opposite locations which are under the influence of external magnetic fields having opposite phase and in noncontact around the shaft, and for detecting the variation of the magnetic characteristics of the magnetic materials, and a signal processing circuit producing a means value of output signals obtained from the magnetic detectors.

The present invention also provides a electromagnetic machine such as an induction motor or generator, comprising: a frame, a stator fixed on an inside peripheral wall of the frame, a rotor fixed on the output shaft and disposed in the gap between the stator, a amorphous magnetic ribbon fixed on the surface of the shaft serving as torque transmitter shaft, at least two magnetic characteristics detecting means mounted in noncontacting relationship with the amorphous magnetic ribbon, an end plate mounted on the detecting means disposed at different portions which respectively are and are not influenced by the magnetic field producing outer side, and a signal processing output circuit for obtaining a mean value of output signals from the detecting means.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

BRIEF DESCRIPTION OF THE PREFERRED EMBODIMENTS

There now follows a detailed description of embodiments of the torque sensor and the electric motor using the sensor of the present invention given with reference to the drawings.

Figure 1:
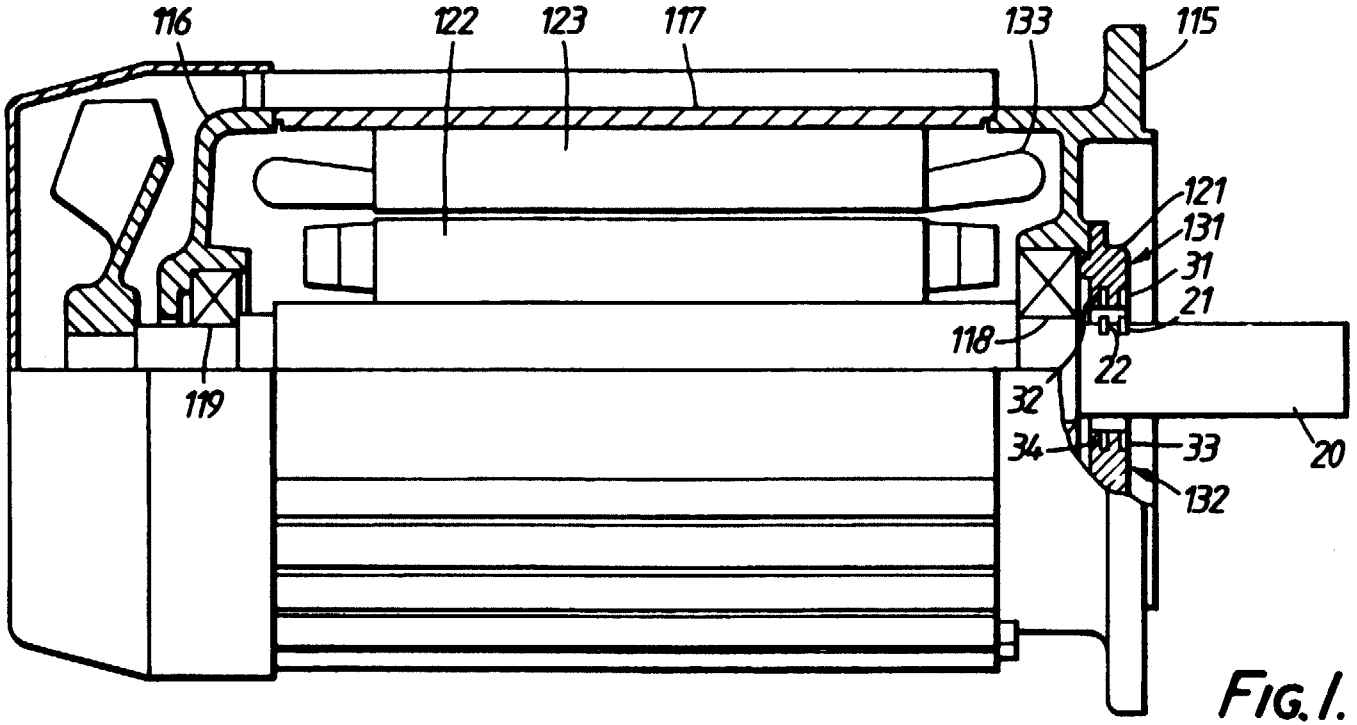
FIG. 1 is a sectional view of a half portion in respect to the center line of the longitudinal sectional view which shows the overall configuration of one embodiment of an induction motor mounted a torque sensor according to the present invention.

FIG. 1 is a schematic view of an embodiment in which the electric motor having a noncontact type torque sensor of the invention is employed to detect the torque of the shaft rotatably mounted on the motor 1.

Figure 2:
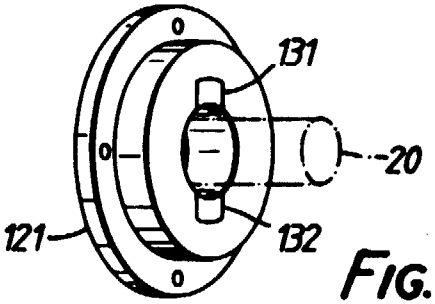
FIG. 2 shows a parts of the end plate fixed on the motor's frame which is shown in FIG. 1.

In FIG. 1, a stator 123 having a stator coil 133 used in a conventional induction motor 1 is fixed on an inside outer peripheral wall in a frame 117. On the motor shaft, used as an output shaft 20, a conventional rotor 122 is rotatably supported by bearings 118 and 119 which are respectively fixed to a nonmagnetic bracket 115 fixed on the frame 117. As can be seen from FIG. 2, an end plate 121 is fixed on the outside of the bracket 115, which is shaped like a doughnut and has two torque detectors 131 and 132 mounted on the inside of the doughnut ring. Two amorphous magnetic ribbons 21 and 22 having high magnetic permeability are fixed on the surface of the output shaft 20 of the motor 1, respectively.

Figure 3:
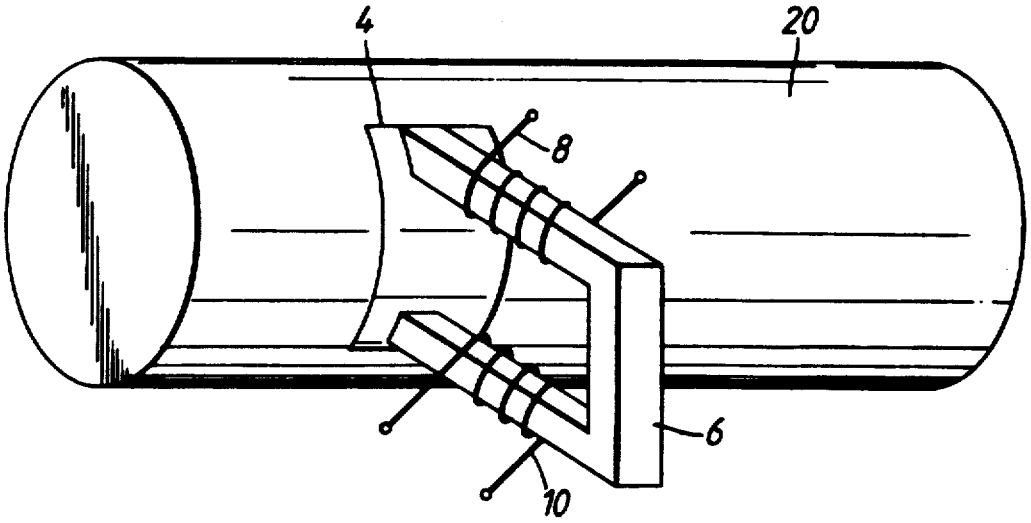
FIG. 3 is a perspective view schematically showing a principle of a torque sensor according to the present invention.

Such an electric motor 1 is operated in the conventional manner. The torque sensors 131 and 132 mounted on the motor detect the torque applied to the output shaft. The principle operation in case of the illustrated one magnetic core of the torque sensor according to the present invention will be described. In a torque sensor of a noncontact type as shown in FIG. 3, a magnetic sheet, preferably an amorphous magnetic ribbon 4 is arranged along the circumferential direction of the shaft 20 and is fixed and bonded to the shaft 20 to which rotary torque is applied. Further, and induced magnetic anisotropy is applied in advance to the amorphous magnetic ribbon 4 in the circumferential direction of the ribbon. A U-shpaed magnetic core 6 formed of a magnetic material, for example, an oxide magnetic material is disposed in the vicinity of the shaft 20, and the end faces of the core 6 are opposite to the amorphous magnetic ribbon 4 through gaps. An exciting coil 8 for generating a magnetic flux and a detecting coil 10 for detecting the magnetic flux depending upon the magnetic permeability of the amorphous magnetic ribbon 4 are wound around the U-shaped magnetic core 6.

Figure 4:
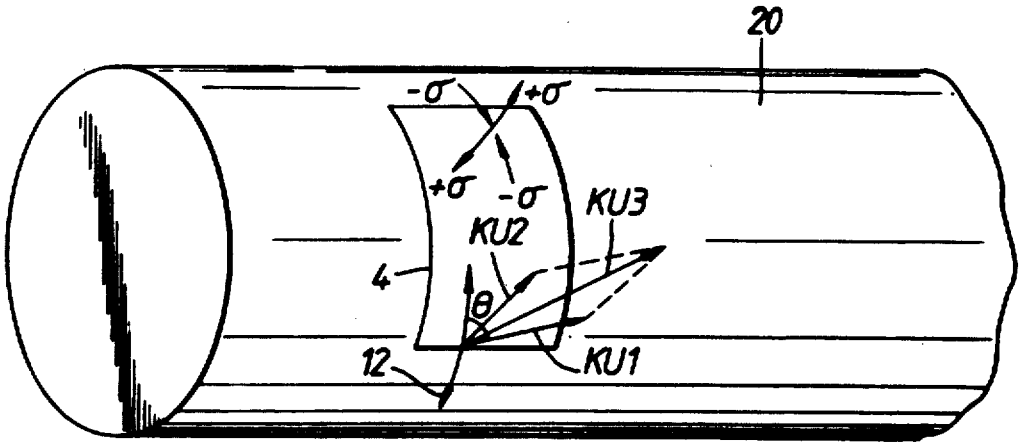
FIG. 4 shows an explanatory view showing the principle of the torque sensor in FIG. 3.

Such a torque sensor of a noncontact type detects the torque according to the principle which will be 7escribed shown in FIG. 4. Here, an induced magnetic anisotropy $Ku_1$ is applied in advance to the amorphous magnetic ribbon 4 in the direction of angle $\theta > 45°$ along the circumferential direction of the shaft 20, and its saturated magnetostriction is to be $\lambda s > 0$. When the rotary torque exists, as shown in FIG. 4, a distortion stress generated at the shaft 20 is transmitted to the amorphous magnetic ribbon 4. A tension $+\sigma$ is produced in a direction of $+45°$ to the circumferential direction in the magnetic fibbon 4, and a compression stress $-\sigma$ is produced in a direction of $-45°$ to the circumferential direction. A magnetic anistropy $Ku_2$ is induced by the magnetostriction in the magnetic ribbon 4 in response to these tensions $+\sigma$ and the compression stress $-\sigma$. Therefore, a magnetic anisotropy $Ku_3$ is produced as the resultant vector of the magnetic anisotropies $Ku_1$ and $Ku_2$. In general, the magnetic permeability depends upon the direction of the vector of the magnetic anisotropy $Ku_3$, and the variations in the magnetic permeability are present as variations in the mutual inductance in the magnetic ribbon 4 between the exciting coil 8 and the detecting coil 10 in the sensor as shown in FIG. 3. In other words, when a constant AC voltage is applied to the exciting coil 8 to generate the magnetic flux which passes through the magnetic ribbon 4 extending along the circumference of the shaft 20 and when torque is applied to the shaft 20, variations in the AC voltage induced in the detecting coil 10 occur. From actual experiments, it has been confirmed that linearity exists between the torque applied to the shaft 20 and the change of the voltage induced in the detecting coil 10 and measured by a voltmeter (not shown).

Figure 5:
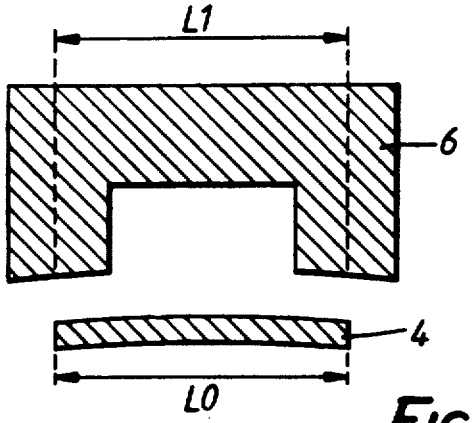
FIG. 5 is a schematic sectional view of the magnetic core of the detector and an amorphous magnetic ribbon shown in FIG. 3.

The amorphous magnetic ribbon 4 is not arranged along the entire circumference of the shaft 20 but is arranged along a given circumferential area, as shown in FIGS. 3 and 4. As shown in FIG. 5, the length L0 of the amorphous magnetic ribbon 4 is suitably in a range $$L_1 \leqq L0 \leqq 2L1$$

where L1 is the effective length of the magnetic path of the magnetic core 6.

The length L1 of the effective magnetic path of the coure 6 is defined as the length of the magnetic path, in which changes in the magnetic flux of the amorphous magnetic ribbon 4 can be effectively detected.

Figure 6:
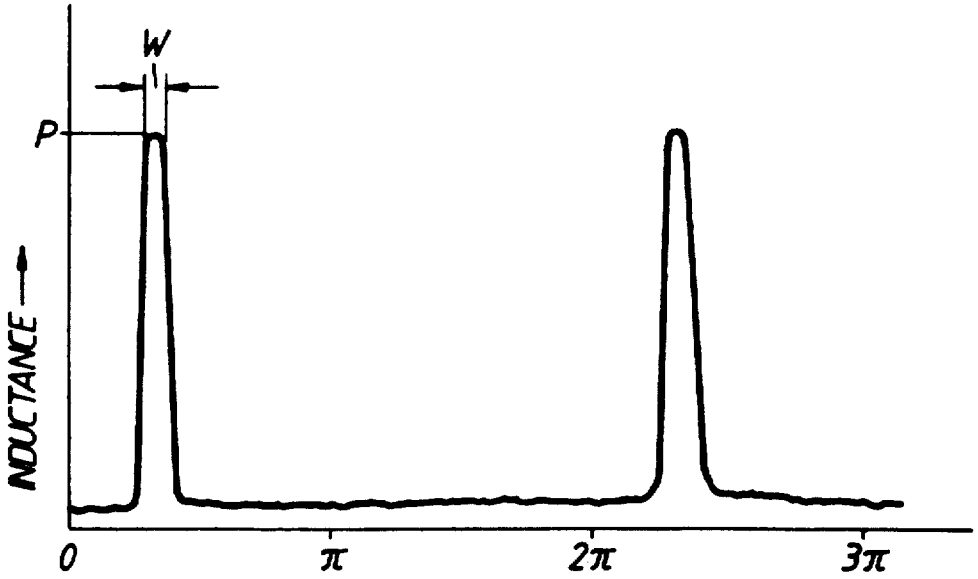
FIG. 6 is a graph showing the relationship between inductance detected by the torque sensor and the rotation angle of the shaft shown in FIG. 3.

The inequality noted above is based on the following considerations. The core 6 can detect changes in the magnetic flux of the amorphous magnetic ribbon 4 only when the center-to-center distance between the faces of the core 6 corresponds to the effective magnetic path length and the amorphous magnetic ribbon is positioned between the centers of end faces of the core 6 while the shaft 20 is being rotated. Therefore, if the length L0 of the amosphous magnetic ribbon 4 is smaller than the effective magnetic path length L1 of the minimum sensor core 6, the inductance P as shown in the graph of FIG. 6 is greatly reduced to reduce the sensitivity of detection. On the other hand, when the length of L0 of the amorphous magnetic ribbon 4 is more than double in effective magnetic path length L1 of the core 6, the width of the peak shown in FIG. 6 is increased and the inductance P is varied to reduce the signal-to-noise ratio. For this reason, it is desired that there exists a condition $L_1 \leqq L0 \leqq 2L1$. Further, considering the fact that the core 6 has a pair of legs, the length L0 is required to be less than one half the length Ls of the circumference of the shaft 2, that is, $L0 < (\frac{1}{2})Ls$.

Figure 7:
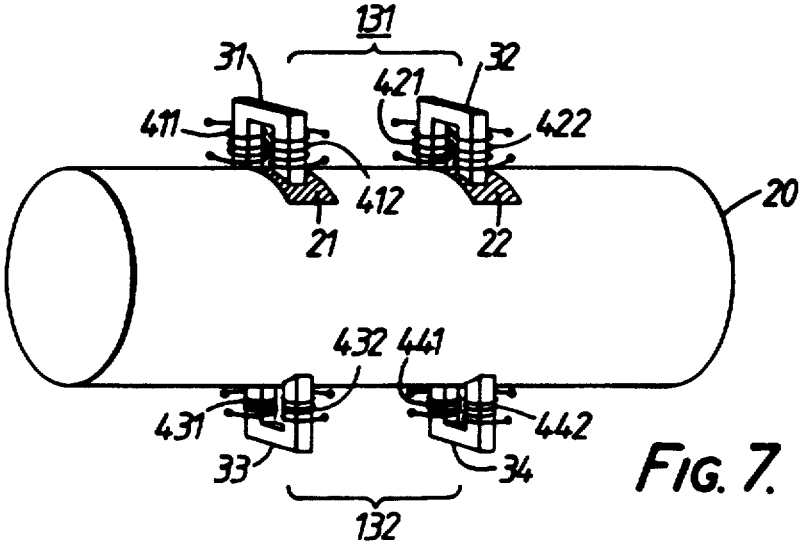
FIG. 7 is a perspective view schematically showing an embodiment of a torque sensor according to the present invention.

FIG. 7 shows a detailed structure of an embodiment according to the present invention. As is shown, a pair of amorphous magnetic ribbons 21 and 22 are bonded by adhesive to a shaft 20 of a ferromagnetic material having a diameter of 40 mm. These pair of amorphous magnetic ribbons 21 and 22 are cut to a length of L0=10 mm from a $(Fe_{0.2}Co_{0.8})_{78}Si_8B_{14}$ amorphous magnetic alloy strip fabricated by a rolling process having a width of 5 mm and a thickness of 30 um. Induced magnetic anisotropy is applied to these magnetic strips 21 and 22 in directions at angles $\theta$ (for example +45°) and $-\theta$ (for example −45°) with respect to the circumferential direction of the shaft 20. The amorphous magnetic alloy compositions are determined by the following formula:

$$(Co_{1-a-b}Fe_aM_b)_zSi_xB_y$$

where M=at least one selected from the group consisting of Ti, Zr, Hf, V, Nb, Ta, Cr, Mo, W, Mn, Re, Ru, Ir, Pd, Pt, Ag, Au, Cu, Zn, Al, Ga, In, Ge, Sn, Pb, Sb, Bi, Y and rare earth metals, $$0.01 \leqq a \leqq 0.5,$$

$$0 \leqq b \leqq 0.15,$$

$$0 \leqq x \leqq 20,$$

$$4 \leqq y \leqq 35,$$

$$x + y + z = 100.$$

Figure 9:
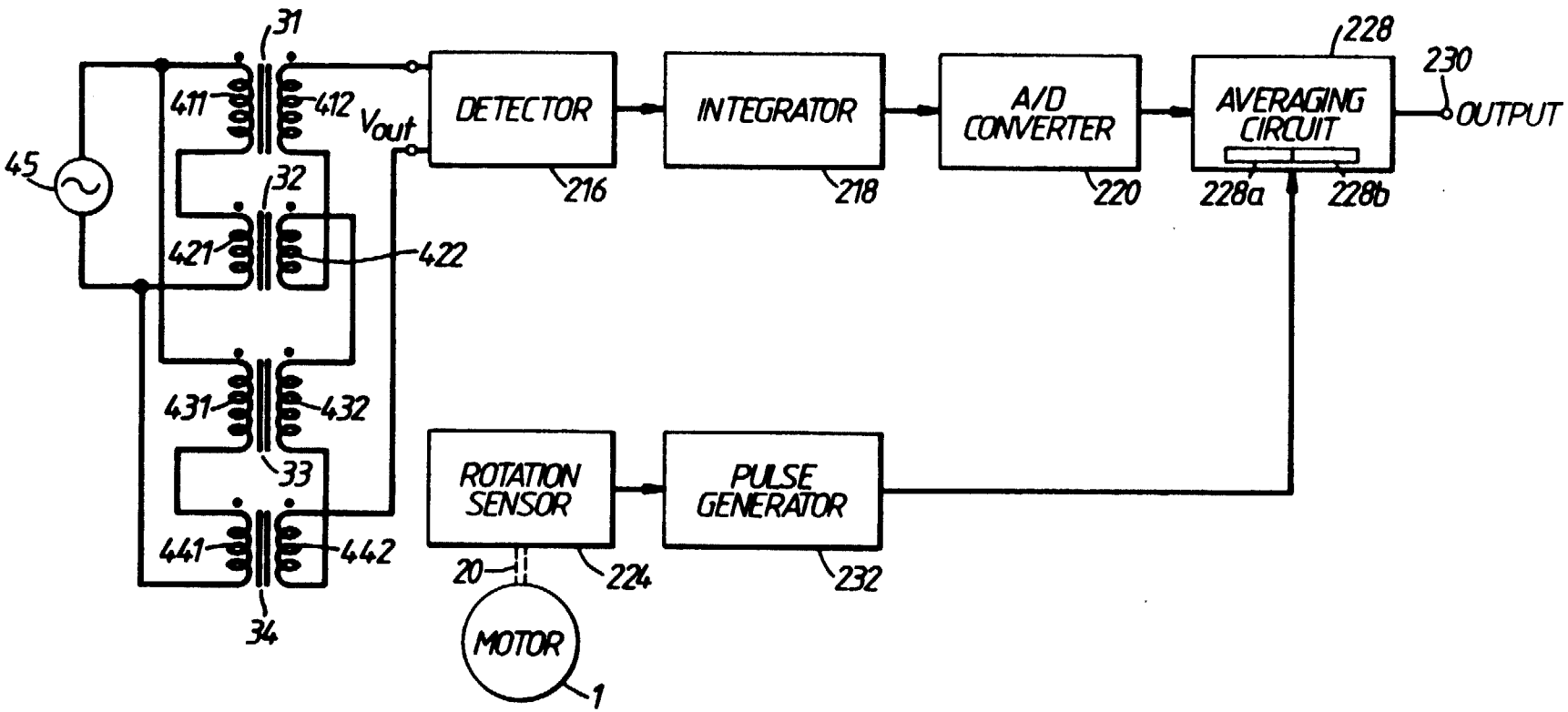
FIG. 9 is a block diagram of the detecting and exciting coils in the detecting processing circuit of the embodiment according to the present invention.

End faces of two pairs of U-shaped magnetic cores 31, 32, 33 and 34 are concentrically arranged around the shaft 20 which transmits a torque with a gap of 1 mm provided between each end face of the cores and the outer surface of the magnetic strips 21 and 22. Exciting coils 411, 421, 431 and 441 and detecting coils 412, 422, 432 and 442 are wound on the cores 31, 32, 33 and 34, respectively. The pairs of detecting coils 412 and 422, and the pair of detecting coils 432 and 442 are differentially connected, respectively, as shown in FIG. 9. The effective magnetic path length L0 of the cores 31, 32, 33 and 34 are set to 10 mm, respectively. Magnetic fluxes are transmitted through magnetic ribbons 21 and 22 in the circumferential direction of the shaft 20.

Figure 8:
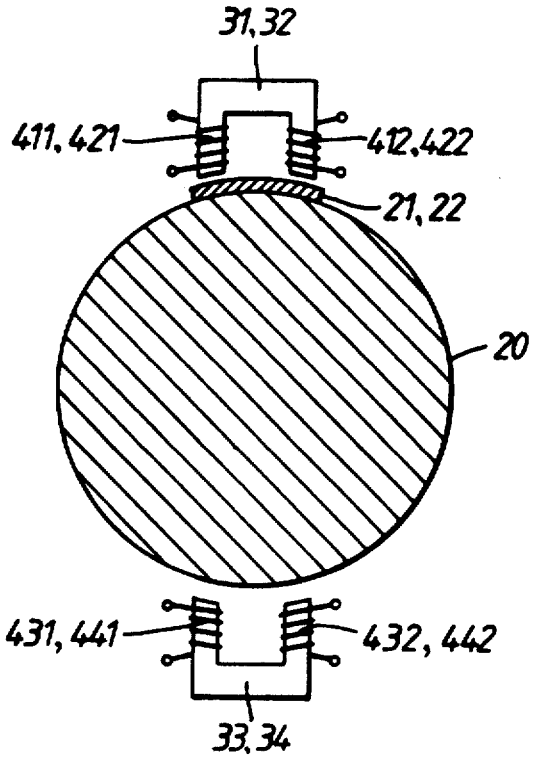
FIG. 8 is a cross-sectional view of the torque transmission shaft and the torque sensor shown in FIG. 7.

As shown in FIG. 8, first pair of magnetic cores 31 and 32 and second pair of magnetic cores 33 and 34 are positioned at the torque transmission shaft 20 with symmetrically positions in dependence on the phase of the external noise factor as influenced by the magnetic field on the circumference of the shaft. The opposite position is 180°. The positions of the pairs of detector may vary in dependence on the magnetic field produced by different kinds of electromagnetic apparata. For example, the theoretical symmetrical positions are 15°, 30°, 45°, 60°, 90°, 120°, 180°, etc. in accordance with different kinds of systems, such as the DC motor, AC mono phase motor, AC three phase induction etc. Pair of magnetic cores are provided at symmetrical and suitable angles at a predetermined distance from the circumference of the shaft.

Next, a circuit for processing detection signals outputted from the detecting coils 412, 422, 432 and 442 shown in FIG. 7 will be described with reference to FIG. 9. Exciting coils 411, 421, 431 and 441 which are cumulatively coupled are connected to an oscillator 45 having a oscillation frequency at 50 KHz as an exciting AC source, and the differentially connected first pair of detecting coils 412 and 422, and second pair of detecting coils 432 and 442 are connected to a detecting circuit 216 in series. The AC source 45 may be used in the frequency range from 1 KHz to 1 MHz. A comparatively good, useful and more suitable range is from 10 KHZ to 100 KHz. When the torque coupled to the shaft 20 is changed while an AC voltage is applied to the exciting coils 411, 421, 431 and 441, the magnetic permeability of the amorphous magnetic ribbons 21 and 22 is changed. A detection voltage signal at a level corresponding to the magnetic permeability is detected by the detecting coils 412, 422, 432 and 442. That is, the detecting coils 412, 422, 432 and 442 generate a detection voltage signal corresponding to the torque coupled to the shaft 20.

Such a torque sensor is provided in order to improve to virtually zero the noise produced due to the lack of uniformity of the magnetic permeability on the shaft, in order to desirably use respectively a pair of cores and differentially connected detecting coils. But, the external noise that is produced by the magnetic influence at the circumference of the shaft on the electric motor etc. is superimposed onto the output signal used to measure the torque. The external noise is included in not only differential output obtained from the first pair of detecting coils 412 and 422 but also a differential output obtaining from second pair of detecting coil 432 and 442. These external noises have a phase difference, which is a reversed phase of 180° on the opposite side of the shaft surface. Then, the detecting coils are differentially in series connected to obtain a cancelled signal (Vout) at the output terminal.

The output voltage signal (Vout) is detected by a detector 216. The detection signal obtained from the detector 216 is fed to an integrator 218 connected thereto for conversion to an integrated output signal.

If more detectors are used, the greater is the signal outputted from the integrated output signal. For example, in this embodiment, in case of using two detectors, twice the detecting output is obtained compared with the case when using only one detector.

The integrated output signal thus obtained is converted from analog signal into digital signals by an analog-to-digital converter 220 connected to the integrator 218. The digital signals thus obtained are averaging by an averaging circuit 228 connected to the analog-to-digital converter 20 in a particular instant.

The shaft 20 to which torque by the motor 1 is applied is provided with a rotation sensor 224 for detecting the rotation rate of the shaft 20. The rotation sensor 224 generates a rotation signal for every rotation of the shaft 20. A pulse generator 232 is connected to the rotation sensor 224, and it generates a synchronous pulse having a predetermined pulse width every time it receives a rotation signal. The pulse generator 232 is connected to the averaging circuit 228, and the digital signal is averaged by the averaging processing circuit unit 228 in response to the synchronizing pulse such as the gate pulse. The averaged digital voltage output is fed to an output terminal 230. Where the amorphous magnetic ribbons 21 and 22 are arranged along the entire circumference of the shaft 20, the rotational rate may be detected at any point. It is necessary that the rotation signal is generated to generate a synchronous pulse while the amorphous magnetic ribbons 21 and 22 are temporarily disposed between the centers of end faces of the cores 31, 32, 33 and 34 when the amorphous magnetic ribbons 21 and 22 are arranged along only the circumference portion of the shaft 20. Accordingly, in the above circuit, magnetic characteristics of a particular circumferential portion of the amorphous magnetic ribbons 21 and 22 are averged at the averaging circuit 228 for each rotation of the shaft 20 to detect a torque applied to the shaft 20. In other words, a pulse signal is generated in synchronism with the rotational rate of the shaft 20, to which the torque is applied, and in response to this pulse, a magnetic characteristic change of the particular circumferential portion of the amorphous magnetic ribbons 21 and 22 is obtained. Thus, it is possible to measure the torque accurately even if the magnetic permeability detected by the detecting coils 412, 422, 432 and 442 is not constant over the entire circumference of the shaft 20.

The averaging circuit 228 includes two arithmetic processing units 228a and 228b, to which a pulse generator 232 is connected. When a gate (synchronizing) pulse is fed to the averaging circuit 228, the first arithmetic processing unit 228a is enabled and the second arithmetic processing unit 228b is disenabled, and when the next pulse is fed to the averaging circuit 228, the first arithmetic processing unit 228a is disenabled and the second arithmetic processing unit 228b is enabled. During the time one of the arithmetic processing units is in the enabled state, the digital detection signals are fed from the A/D converter 220 to averaging processing circuit 228 and are accumulated and processed by the enabled arithmetic processing unit of the averaging circuit. As a result, the averaging circuit 228 provides an averaged voltage signal to output terminal 230.

In the above circuit, magnetic characteristics of the amorphous magnetic ribbons 21 and 22 secured to the shaft 20 to which torque is applied, are averaged by the averaging circuit 228 for each rotation of the shaft 20, whereby an average voltage digital signal corresponding to the magnetic characteristics of the amorphous magnetic ribbons 21 and 22 is provided from the output terminal 230. That is, a pulse signal is generated in synchronism with the rotational rate of the shaft 20 to which torque is applied, and the magnetic characteristics of the particular circumferential portion of the amorphous magnetic ribbons 21 and 22 are averaged in response to the pulse.

Thus, even if the magnetic influence by the detecting coils 412, 422, 422 and 442 is not constant in the vicinity of the end plate where the sensors are mounted and even if the magnetic permeability detected by the detecting coils 412, 422, 432 and 442 is not constant over the entire circumference of the shaft 20, the torque can be measured accurately by cancelling the effect of the lack of uniformity of the magnetic circumstance and by averaging and without being affected by the lack of uniformity of the magnetic permeability. Particularly, even where the induction motor of the shaft 20 to which torque is applied is made of ferromagnetic material, e.g., a Fe system, it is possible to prevent output fluctuations stemming from the lack of uniformity of the external magnetic flux and the magnetic permeability, and obtain stable torque detection with a large signal-to-noise ratio. Further, the torque sensor itself may have a reduced size and be accommodated in a small space. In the combination of the magnetic ribbon provided on a circumferential portion of the peripheral surface of the shaft and the detecting circuit having the averaging circuit, it is possible to easily detect a change of the torque in a predetermined rotation angle range of the shaft and under the influence of the external magnetic fluxes.

A signal processing circuit such as the above mentioned circuit outputs the output signal which is synthesized by cancelling the noise and averaging the signal of all signals obtaining from the detecting coils.

Figure 10:
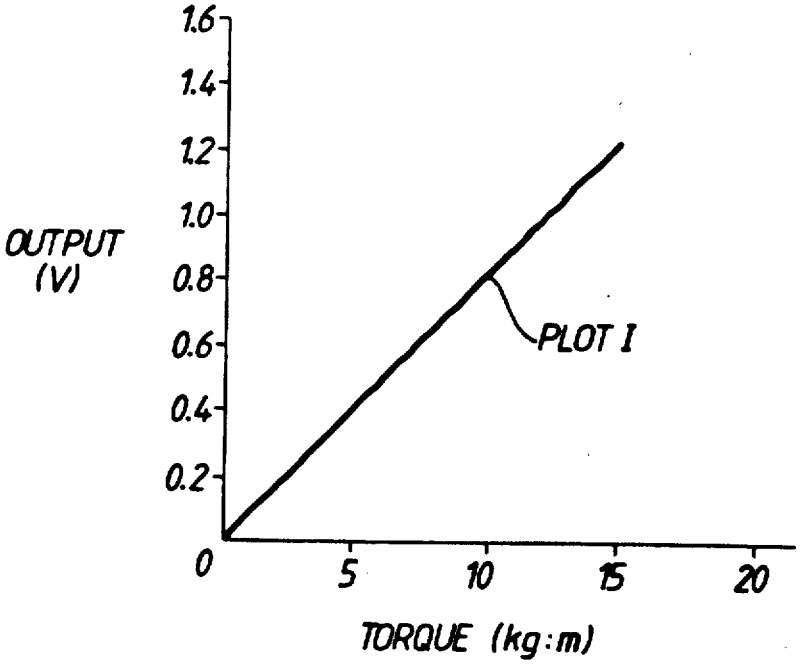
FIG. 10 is graph showing the relationship between the output voltage (Vout) detected by the detecting coils and the torque.

Practically, it is found that when the torque applied to the shaft 20 is detected with the torque sensor using the circuit of FIG. 9 while the shaft 20 is rotated at 1500 rpm, the output voltage changes linearly with a sufficiently S/N ratio according to a changing torque as shown in FIG. 10.

The amorphous magnetic ribbon and magnetic core may be made of Permalloy, Sendust and Fe-Si alloys as well as amorphous magnetic alloy materials.

Figure 11:
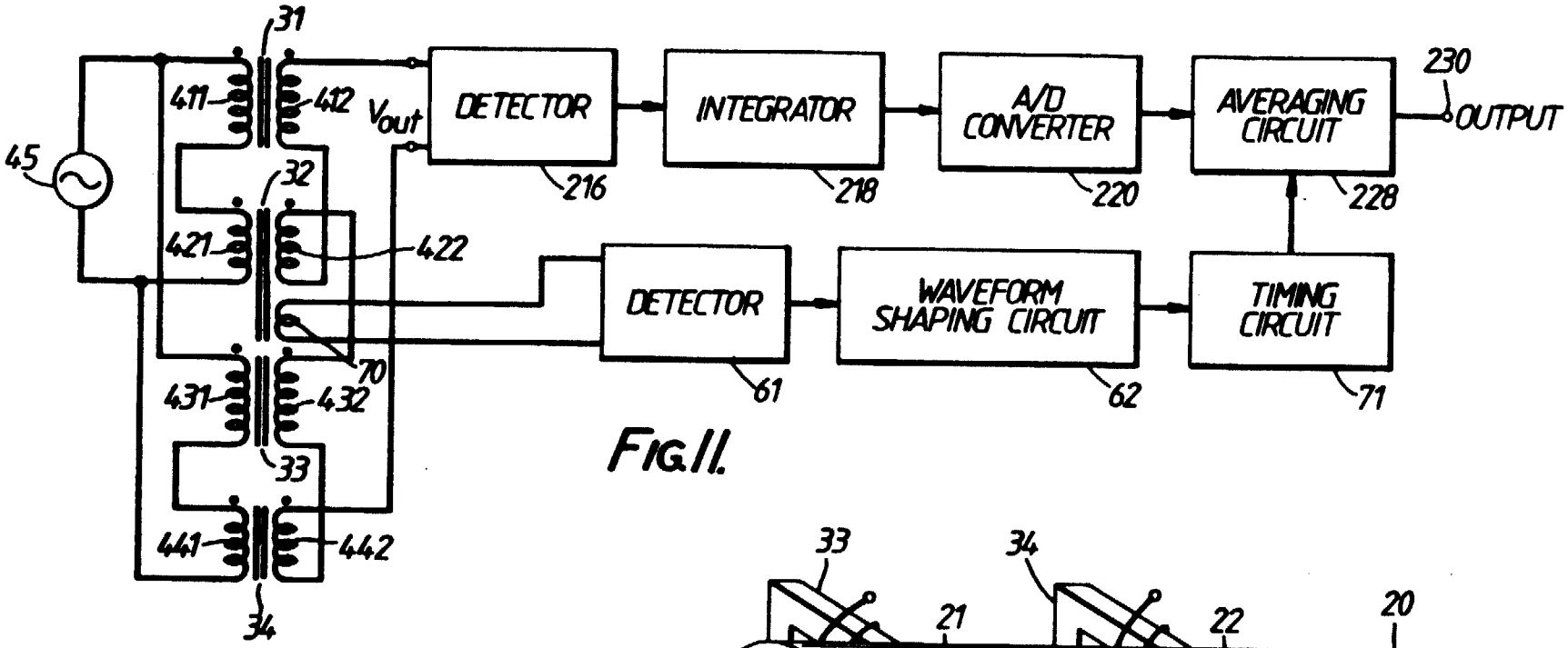
FIG. 11 is a block diagram of a signal processing circuit applied to the torque sensor or another embodiment according to the present invention.
Figure 12:
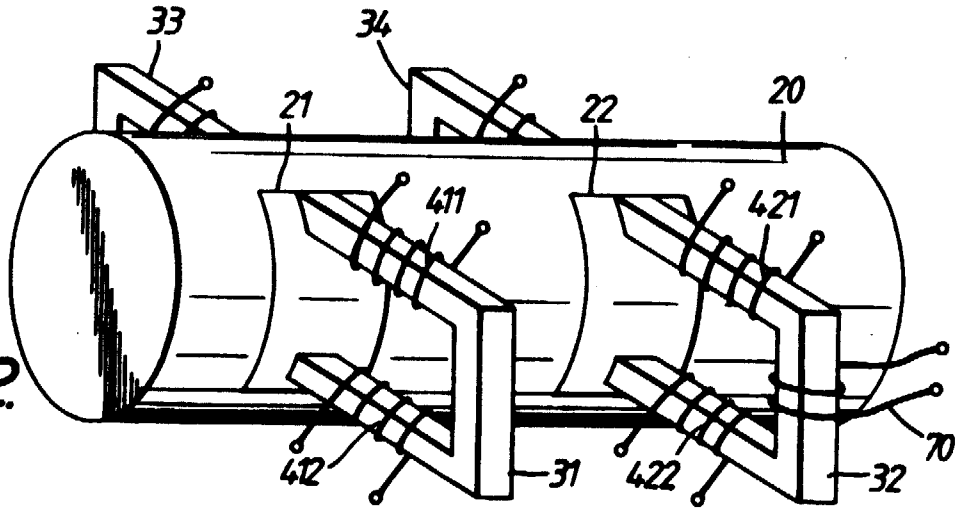
FIG. 12 is a schematical perspective view of an example of the configuration for the detector signal processing circuit shown in FIG. 11.

A modification of the circuit for obtaining the synchronizing signals using the averaging circuit 228 employed in the torque sensor according to the present invention, will now be described with reference to FIG. 11 and FIG. 12. In FIG. 11, reference numerals like those in FIG. 9 designate corresponding or identical parts. In the circuit of FIG. 11, the third coil 70 is wound as shown in FIG. 12 on at least one of the detector magnetic cores, such as the core 32, and is used instead of the rotation sensor and the pulse generator.

The signal produced by the third coil 70 is detected at detector circuit 61, and the signal of the detector circuit 61 is fed to a wave form shaping circuit 62. After wave form shaping, the signal is applied to timing circuit 71, which applies synchronizing pulse signals to the averaging circuit 228 based on the wave form shaped signal from the wave forming circuit 62.

Figure 13:
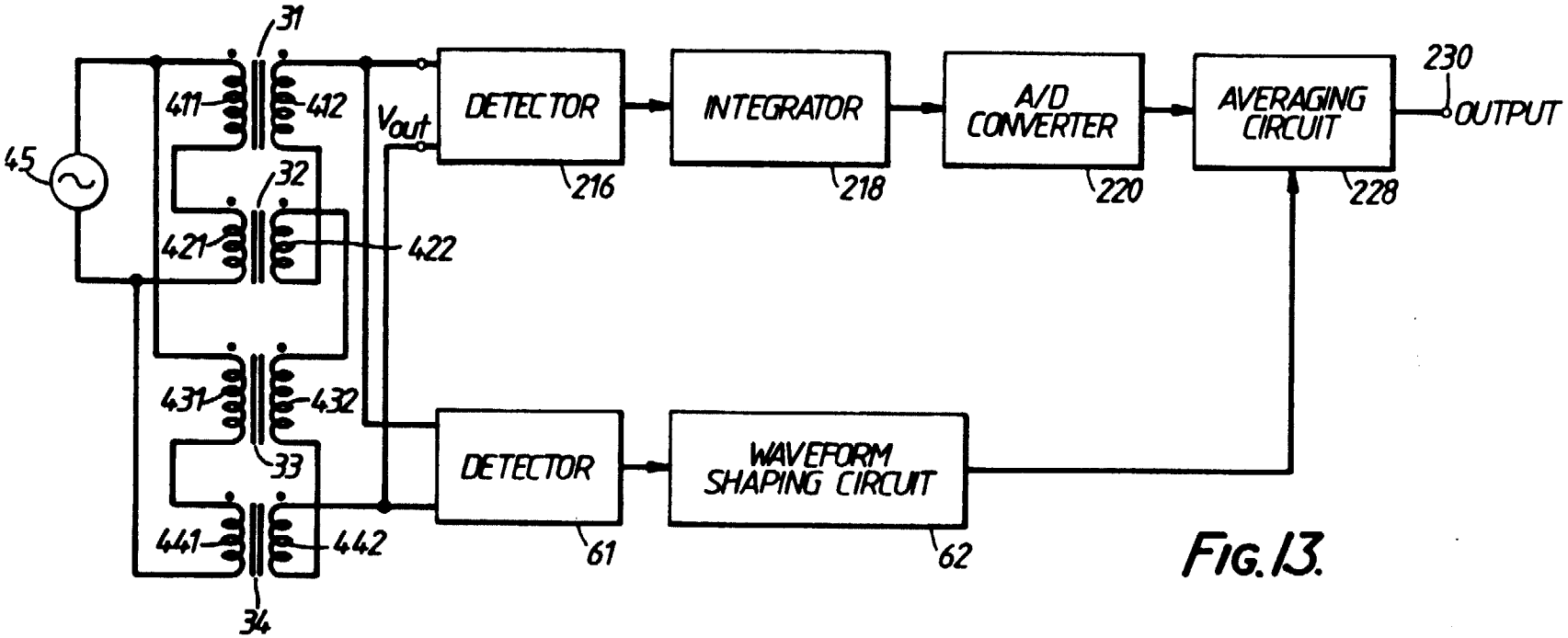
FIG. 13 is a block diagram of a detected signal processing circuit applied to the torque sensor of a still another embodiment according to the present invention.

Another embodiment for producing the synchronizing pulse signals formed by the signal processing circuit is provided as shown in FIG. 13, by using the sensor output signal Vout of the detecting coils. The Vout signal is inputted to the detector circuit 61 and then the obtained signal is made into synchronizing pulse signals by wave shaping circuit 62. Therefore, the synchronizing pulse signals fed to the averaging processing circuit is obtained from wave shaping circuit 62.

Figure 14:
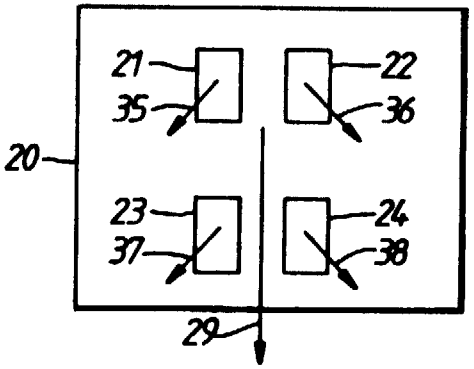
FIG. 14 is an illustration of the extended view of the shaft surface of a still another embodiment according to the present invention.

And, still a further embodiment according to the present invention is shown in FIG. 14, which illustrates an extended view of the shaft surface. Two pair of magnetic ribbons 21 and 22, and 23 and 24 are fixed on the surface of the shaft 20 for producing a high output signal having sufficient S/N ratio. The directions of the induced magnetic anisotropy indicated by numbers 35, 36, 37 and 38 for selected pairs of the magnetic ribbon 21, 22, 23 and 24 are arranged to be pointed in the same directions relative to the rotating direction 29. Thus directions 35 and 37 are arranged to be the same, and directions 36 and 38 are also same.

What is claimed is:

1. A torque sensor for detecting a torque applied to a shaft, comprising:

at least one member of a magnetic material provided on a circumferential portion of the peripheral surface of said shaft;

at least one pair of magnetic detectors disposing at opposite locations where external magnetic fields have opposite phase in noncontact around said shaft for detecting a variation of the magnetic characteristics of said member of magnetic material and for producing corresponding output signals; and a signal processing circuit producing a mean value of output signals obtained from said magnetic detectors, comprising a cancelling circuit means for cancelling a signal obtaining from each of said pair of magnetic detectors.

2. The torque sensor as claimed in claim 1, wherein said at least one pair of magnetic detectors includes output circuits connected in series across an input to said cancelling circuit.

3. The torque sensor as claimed in claim 1, wherein said signal processing circuit comprises an average processing circuit for averaging an output signal from said cancelling circuit.

4. The torque sensor as claimed in claim 3, wherein said average processing circuit comprises two arithmetic processing units sequentially and alternately operated in an enable state and a disenable state.

5. The torque sensor as claimed in claim 3, wherein said average processing circuit is connected with a synchronizing pulse producing circuit which produces a pulse signal in synchronism with rotation of said shaft.

6. The torque sensor as claimed in claim 5, wherein said synchronizing pulse producing circuit is provided a rotation sensor and pulse generator.

7. The torque sensor as claimed in claim 6, wherein said rotation sensor is mounted on said shaft.

8. The torque sensor is claimed in claim 1, wherein said signal processing circuit comprises:

an integrating circuit for integrating a composite output signal derived from the output signals of said plural magnetic detectors; and an average processing circuit for averaging an integrated composite output signal produced by said integrating circuit.

9. The torque sensor as claimed in claim 1, wherein a synchronizing pulse signal is obtained from an output voltage signal which is produced from a selected of said magnetic detectors.

10. The torque sensor as claimed in claim 9, comprising means for generating a synchronizing pulse, including a circuit which is provided with a detector circuit connected to the output circuit of one of said magnetic detectors and a wave form shaping circuit for wave shaping an output of said detector circuit and applying a wave shaped output to said signal processing circuit.

11. The torque sensor as claimed in claim 1, wherein said member of magnetic material comprises an amorphous magnetic alloy having a composition determined by the following formula:

$$(Co_{1-a-b}Fe_aM_b)_zSi_xB_y$$

where M = at least one element selected from the group consisting of Ti, Zr, Hf, V, Nb, Ta, Cr, Mo, W, Mn, Re, Ru, Ir, Pd, Pt, Ag, Au, Cu, Zn, Al, Ga, In, Ge, Sn, Pb, Sb, Bi, Y, and rare earth metals, $$0.01 \leqq a \leqq 0.5,$$

$$0 \leqq b \leqq 0.15,$$

$$0 \leqq x \leqq 20,$$

$$4 \leqq y \leqq 35, \text{ and}$$

$$x + y + z = 100.$$

12. The torque sensor as claimed in claim 11, wherein said magnetic material member is made from amorphous magnetic ribbons of a $(Co_{0.8}Fe_{0.2})_{78}Si_8B_{14}$ amorphous magnetic alloy strip.

13. A torque sensor for detecting a torque applied to a shaft, comprising:

a pair of magnetic material members arranged in a circumferential direction on the peripheral surface of said shaft;

a pair of magnetic detectors each including a pair of magnetic core members disposed around said shaft in relation to respective of said magnetic material members at predetermined locations where external magnetic fields are opposite in phase, said magnetic core members each comprising, end faces which face a respective one of said magnetic members upon rotation of said shaft with a gap between each said end face and said magnetic material member, an exciting coil wound on a respective of said magnetic core members and energized by an AC source for producing a magnetic flux in the respective magnetic material member, and a detecting coil wound on a respective of said magnetic core members for detecting the magnetic flux produced in said respective magnetic member by the respective exciting coil and producing an output signal corresponding to the detected magnetic flux; and a signal processing circuit connected to said detector coils for producing an mean value of outout signals obtained from said detector coils, comprising a cancelling circuit means for cancelling portions of output signals from pairs of detecting coils of the pair of magnetic detectors.

14. The torque sensor as claimed in claim 13, wherein the detecting coils of said magnetic detectors are differentially connected in series.

15. The torque sensor as claimed in claim 13, wherein said signal processing circuit is synchronized by a synchronizing pulse obtained from a coupling coil coupled to at least one of said magnetic core members.

16. The torque sensor as claimed in claim 15, comprising:

a detector circuit connected to said coupling coil, a wave shaping circuit connected to said detector circuit, and a timing circuit connected to said wave shaping circuit.

17. The torque sensor as claimed in claim 13, wherein said exiting AC source generates a frequency in the range from 1 KHz to 1 MHz.

18. The torque sensor as claimed in claim 17, wherein said exiting AC source generates a frequency in the range from 10 KHz to 100 KHz.

19. The torque sensor as claimed in claim 13, wherein said magnetic material members essentially consist of a material selected from a group consisting of amorphous magnetic alloys, Permalloy, Sendust and Fe-Si alloys.

20. The torque sensor as claimed in claim 13, wherein said core members essentially consist of a material selected from a group consisting of amorphous magnetic alloys, Permalloy, Sendust and Fe-Si alloys.

21. The torque sensor as claimed in claim 13, wherein said magnetic material members are ribbon like and arranged over only a portion of the circumference of said shaft.

22. The torque sensor as claimed in claim 13, wherein each said magnetic member has a dimension defined by the following equation, $$L1 \leqq L0 \leqq 2L1,$$

where L0 is a length of the circumferential dimension of said magnetic material member and L1 is the effective length of the magnetic path of each said magnetic core member.

23. An electric machine comprising:

a frame;

a stator fixed on an inside peripheral wall of said frame;

an output shaft which is rotatably mounted in said frame;

a rotor fixed on said output shaft and disposed in a gap between said stator and said shaft;

at least one amorphous magnetic ribbon fixed on a surface of said output shaft;

at least two differentially interconnected detecting means placed very close to said amorphous magnetic ribbon and at opposite locations around said output shaft;

an end plate in which said detecting mean are mounted, formed on the end of said frame; and a signal treatment circuit for obtaining the average of signals outputted by said detecting means.

24. The electric machine as claimed in claim 23, wherein said detecting means are placed in the vicinity of a bearing on said end plate.

25. The electric machine as claimed in claim 23, wherein said detecting means are placed at diammetrically opposite locations around said shaft.

26. The electric machine as claimed in claim 23, wherein said electric machine is an induction motor.

* * * * *